Feb. 17, 1931.    A. VIGNE    1,793,294
TROLLEY WHEEL
Filed March 26, 1928
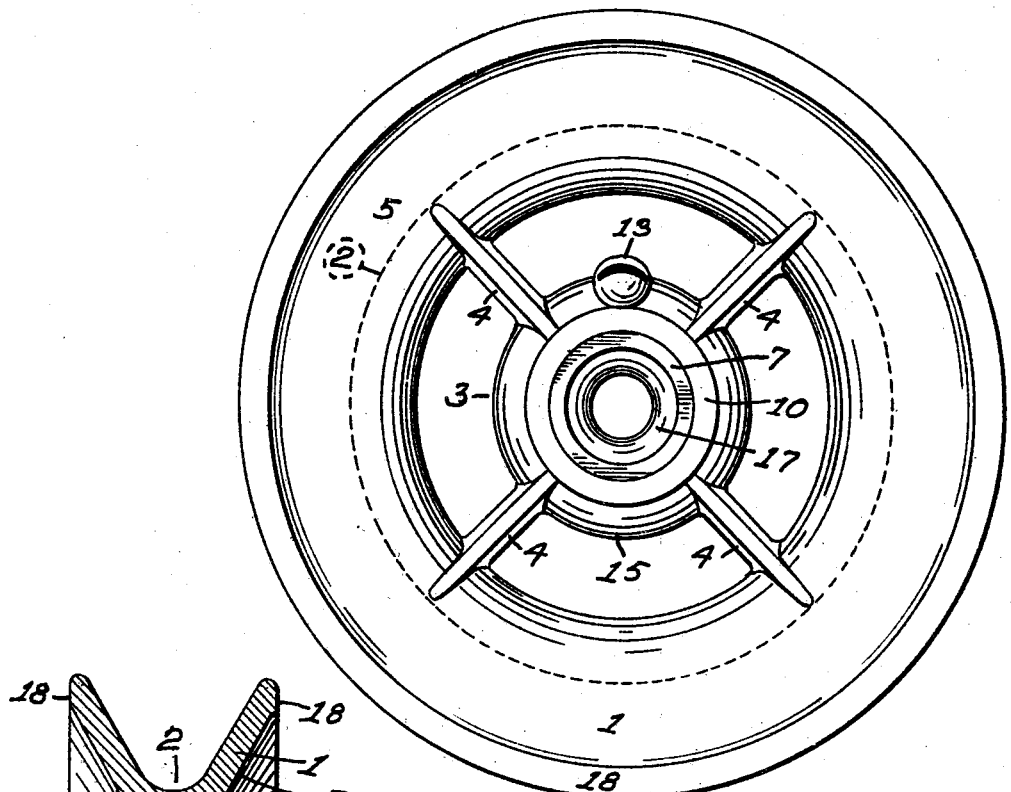
Fig·1·
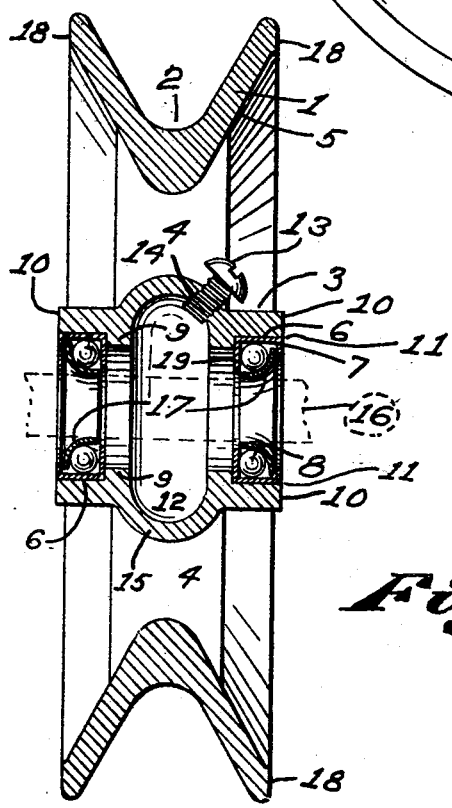
Fig·2·
Inventor:
Albert Vigne,
By Hugh H. Wagner
Attorney.

Patented Feb. 17, 1931

1,793,294

UNITED STATES PATENT OFFICE

ALBERT VIGNE, OF ST. LOUIS, MISSOURI, ASSIGNOR TO NATIONAL BEARING METALS CORPORATION, OF ST. LOUIS, MISSOURI, A CORPORATION OF NEW YORK

TROLLEY WHEEL

Application filed March 26, 1928. Serial No. 264,929.

This invention relates generally to wheels, and has more particular reference to a wheel especially adapted for conveying the current from a feed wire to a vehicle moving with relation thereto.

The object of the invention is to provide a trolley wheel having bearings embodying anti-frictional rolling elements therein and which shall be of simple, durable, and efficient construction.

Other objects and advantages, more or less auxiliary to the foregoing, will appear in the course of the following description of a preferred embodiment of the invention.

In the accompanying drawings forming part of this specification, in which like numbers of reference denote like parts wherever they occur, Figure 1 is an end elevation of a trolley wheel made in accordance with this invention; and Figure 2 is an axial sectional view of the same.

The wheel may be formed of brass, bronze, or other suitable material, and comprises a rim 1 of substantially V-shaped cross-section to provide a peripheral groove 2 to receive the feed or conductor wire, and a central hub 3 connected by spokes 4 to the rim 1. The spokes 4 may be of any suitable cross-section, but are preferably substantially wider in an axial plane than they are in a radial plane, so as to extend along the outer inclined sides 5 of the V-shaped rim 1. The hub 3 is recessed to provide seats for suitable anti-friction bearings. The bearings are preferably of the ball-bearing type, although bearings of an equivalent type, such, for instance, as roller bearings, may be employed without departing from the spirit of the invention.

The hub 3 is bored at 6 to fit the exterior annular face of the outer race 7 of the ball bearings 8 in the ends of the bore or opening 6. The bore is contracted radially behind the seats of the races 7 to form a flange 9 that provides a shoulder against which the inner end of the outer race 7 may be seated. After the ball bearings have been placed in position in the ends of the bore 6, they may be secured in such position by peening the end faces 10 of the hub 3 to force the material of the hub thereat tightly against the race 7, as at 11. The opening 6 enlarges radially intermediary of the flanges 9 to form a lubricant-holding annular reservoir 12. A screw 13 normally closes an internally screw-threaded opening 14 that affords access to the interior of the groove 12 to supply lubricant thereto or for other purposes. The groove 12 is preferably formed in the wheel as the latter is being cast, the wall 15 that encloses said groove preferably bulging outwardly to enlarge the groove radially. The pin or shaft 16 of the trolley pole, of course, passes through the inner races 17 of the ball bearings. The end faces 10 of the hub 3 are machined or finished true, as are the end faces 18 of the rim 1.

It will be observed that the ball bearings can be easily inserted in the manner stated, and, when it becomes necessary to remove them from the hub 3, they may be forced outwardly against the peened-over portions 11 of the end faces 10 by inserting a suitable tool through the inner race of the opposite bearing and forcing the same against inner lateral face 19 of the outer race 7. The construction is simple in that no plates, screws and other parts are necessary to secure the ball bearings in the hub 3. Furthermore, when the wheel is rotating rapidly as it is moving along the feed wire, the lubricant is projected towards the bottom of the groove 12 by centrifugal action, so that it does not leak unduly laterally through the ball bearings to scatter in all directions after passing therethrough.

Having thus fully described this invention, I hereby reserve the benefit of all changes in form, arrangement, order, or use of parts, as it is evident that many minor changes may be made therein without departing from the spirit of this invention or the scope of the following claim.

I claim:

A trolley wheel including a hub portion having a bore adapted to receive ball races at the opposite ends thereof, said bore being contracted radially to present flanges to abut the inner sides of said races, said bore being further enlarged radially intermediary said flanges to form a lubricant-holding annular reservoir, the outer faces of said hubs being peened to bear directly against the adjacent edges of the races to maintain the latter between said outer faces and said flanges.

In testimony whereof I hereunto affix my signature.

ALBERT VIGNE.